United States Patent

[11] 3,631,987

| [72] | Inventor | Peter A. Cattano, Sr.<br>44 Miller Ave., Freeport, N.Y. 11520 |
|---|---|---|
| [21] | Appl. No. | 869,143 |
| [22] | Filed | Oct. 24, 1969 |
| [45] | Patented | Jan. 4, 1972 |

[54] SWIMMING POOL WATER CLARIFIER
8 Claims, 6 Drawing Figs.

[52] U.S. Cl. .................................................. 210/452, 210/505
[51] Int. Cl. ....................................................... B01d 35/00
[50] Field of Search............................................. 210/169, 435, 436, 451, 452, 505–510

[56] References Cited
UNITED STATES PATENTS

| 2,395,301 | 2/1946 | Sloan............................ | 210/508 X |
| 2,784,845 | 2/1959 | Fain et al....................... | 210/169 X |
| 2,936,891 | 5/1960 | Kukowski et al. ............ | 210/510 X |
| 2,945,557 | 7/1960 | Powers.......................... | 210/507 X |
| 3,246,767 | 4/1966 | Pall et al....................... | 210/506 X |

FOREIGN PATENTS

| 351,304 | 7/1905 | France ......................... | 210/436 X |

Primary Examiner—Reuben Friedman
Assistant Examiner—R. W. Burks
Attorney—Leonard H. King

ABSTRACT: For use for clarifying the water in a swimming pool; an improved filter characterized by the absence of any replaceable particulate type filter media includes a fibrous porous filter member and a rigid, fibrous, porous support member.

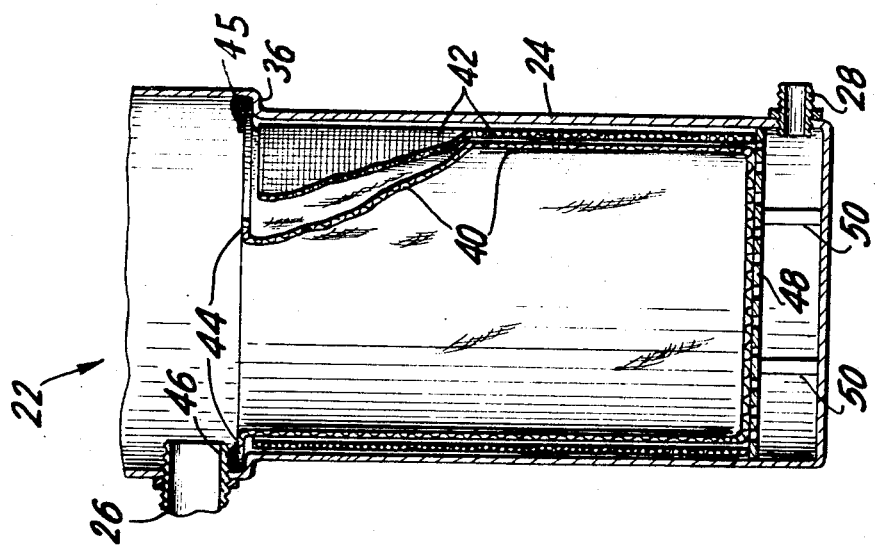
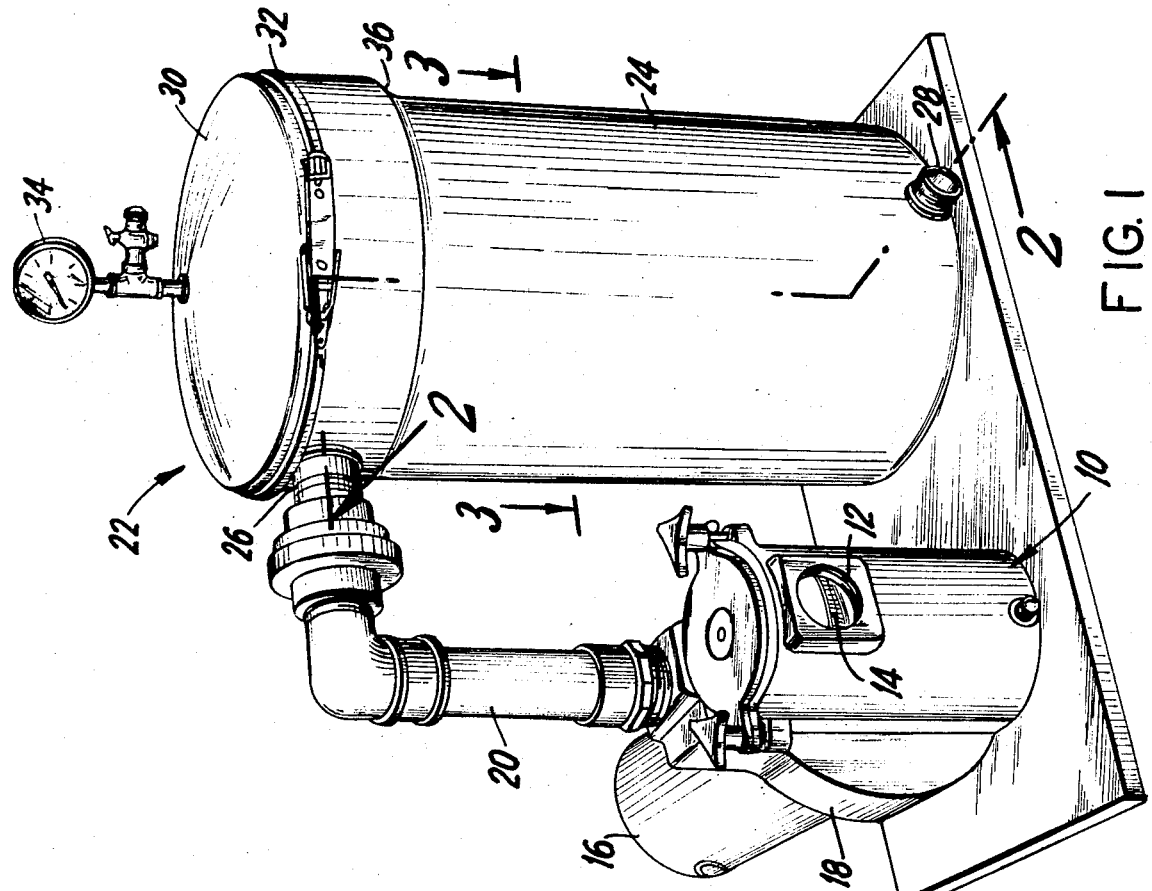

INVENTOR.
PETER A. CATTANO, SR.
BY Leonard H. King
ATTORNEY

SWIMMING POOL WATER CLARIFIER

This invention relates generally to liquid filtering means and more particularly to improved filteration means for swimming pools.

BACKGROUND OF THE INVENTION

During the last few years there has been a very large increase in the number of swimming pools in use. This is particularly true in the instance of relatively small size pools that are used at private residences, apartment houses, motels, etc. The increased use of swimming pools has resulted in a corresponding increase in the use of swimming pool water filtering means that permit continued, recirculating use of a supply of water while at the same time keeping the water free of particulate matter.

The most common filter media is sand. However, in recent years diatomite filters that were initially used in the food and chemical process industries have become commonplace. Even more recently cartridge type filters developed initially for use by the automotive industry have come into usage. However, none of these filtration methods are designed specifically for the contaminated condition encountered in recirculating swimming pool water.

Filtration is basically a screening process. That is, insoluble particles are separated from a solid-liquid system. Basically, there are four principal methods that may be used for true filtration.

The first method may employ microsieves in which there are provided pore openings small enough to retain very small particles which go beyond the turbidity limits established for a particular quality of water. Diatomite and cartridge filters utilize this method of filtration.

A second method of filtration may be practiced by the use of interstitial embedment wherein the particulate matter becomes entrapped within the interstices of the filter medium. This is considered filtration in depth and high-rate sand filters are an example of this action.

Particulate consolidation is still a third method of filtration. This method provides that smaller particles agglomerate into large masses which are then screened out by the medium. The filtration action is generally brought about by the addition of a coagulation agent in the liquid-solid system. Conventional sand filters utilize this third method by employing alum as the coagulant.

A further commonly used method of filtration may be described as surface attraction. In this last-mentioned method very small colloid particles are attracted to the material of the filter medium by electrokinetic forces.

A typical example of the prior art is disclosed in the M. E. Fain et al. U.S. Pat. No. 2,874,854 issued on Feb. 24, 1956. The structure disclosed by Fain et al. comprises a pervious, basketlike filter support member in which is mounted a fibrous filter in the form of a cylindrical bag. Fain et al. absolutely requires that diatomaceous earth form an inner liner or precoating on the filter fabric. As is well known, the diatomaceous earth must be frequently changed. The diatomaceous earth filter must be serviced seven times more frequently than the filter of the present invention. While the Fain et al. patent may appear to be structurally close to the present invention as will be described hereinafter, the requirement for diatomaceous earth distinguishes the Fain et al. structure from this invention. In fact, the Fain et al. patent is directed primarily to means for simplifying and reducing the messiness inherent in the frequent changing of the diatomaceous earth filter aid.

The present invention, by way of contrast utilizes the best features of the prior art filtration methods. In addition, the present invention provides for the control of pore size and permeability of the filter media, both independently or together. The concept of the present invention provides "polishing" of the water by means of smaller particle retention, filtration in depth, reduced blinding and a substantially increased filtration cycle that is almost seven times greater than that achieved with either diatomite or high-rate sand filters, approximately five times greater than conventional sand filter systems and almost four and one-half times greater than cartridge filter systems.

The filter media element of the present invention is preferably formed of a plastic nonwoven textile screen such as dacron or polypropylene, to which is joined fibers of polypropylene. Several examples of nonwoven textiles include wool felt, thermally bonded fabrics and mechanically interlocked felt. The aforementioned textile fabrics are made of staple fibers that are processed on textile equipment to produce a uniform fibrous batt. Nonwoven textiles have a three-dimensional homogenous fiber distribution that provides for retention of finer particles. There is also a tendency to eliminate blinding.

The filter media element of this invention is in the form of a nonself-supporting, easily removable basket. The present invention further includes spacer means intermediate the filter media element and the interior wall surface of the filter tank. The preferred spacer is formed of plastic fibers woven to provide a porous self-supporting cannula type screen which is comprised of a plurality of longitudinally extending tubes sandwiched between two radially spaced surfaces.

The present invention provides a simple arrangement for cleaning of the filter of a swimming pool that is particularly advantageous for a homeowner and for those smaller installations where skilled personnel may not be available. The present invention further provides a filter characterized by high permeability coupled with retentivity thus providing maximum liquid flow or minimal requirements for pumping capacity.

Accordingly, it is a primary object of this invention to provide an improved filter means, particularly for swimming pools or the like.

It is another important object of this invention to provide an improved swimming pool filter means that is characterized by the absence of any particulate filter aid, such as diatomite, sand or the like.

Still another important object of this invention is to provide an improved swimming pool filter wherein the filter media clarifies and polishes the water.

Another object of this invention is to provide an improved filter for swimming pools or the like wherein the filter media is nonrigid fibrous plastic basket that is supported by a rigid fibrous spacer.

It is a feature of this invention that the spacer member as described above provides a cushioning effect that prevents the filter element from directly engaging the inside wall surfaces of the tank when the filter element is subjected to high water pressures.

An advantage of this invention is that the filter media is easily washable and is therefore reusable.

These and other objects, features and advantages of the invention will, in part, be pointed out with particularity, and will, in part, become obvious from the following more detailed description of the invention, taken in conjunction with the accompanying drawing, which forms an integral part thereof.

In the various figures of the drawing like reference characters designate like parts.

BRIEF DESCRIPTION OF THE DRAWING

FIG. 1 is a perspective view illustrating a system comprising the present invention;

FIG. 2 is a sectional elevational view taken along line 2—2 of FIG. 1;

Figure 3:
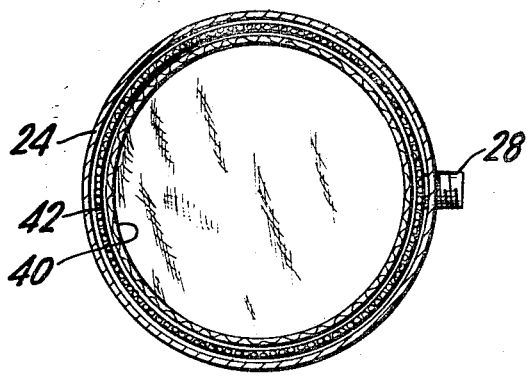
FIG. 3 is a sectional plan view taken along line 3—3 of FIG. 1.

Referring first to FIG. 1, there is shown a filtering system that is particularly adapted for use with relatively small size swimming pools. There is shown a canister 10 having inlet means 12 adapted to receive a flow of water from the swimming pool by conduit means (not shown). A strainer basket 14 is positioned in the canister 10 and is adapted to entrap the larger size particles or insects that may fall into the pool. A motor 16 and a pump 18 moves the water through the canister 10 and the basket 14 and then through conduit 20 for delivery to the filter means 22 comprising this invention.

The filter means 22 is comprised of a tank 24 having inlet means 26 proximate the upper end thereof and in communication with the conduit 20. The bottom end of the tank 24 is provided with outlet means 28, which together with suitable tubing (not shown) provides for return of filtered water to the pool. A cover member 30 is secured to the tank 24 by means of a ring clamp 32 or other suitable hardware. A conventional pressure gage 34 may be provided in the cover 30.

For purposes to be described hereinafter the tank 24 includes an upper lip. As shown particularly in FIG. 2 the filter media 40 is basketlike in shape and is positioned within a cannular support member 42. Considering first the filter media 40, it will be seen that there is provided a radially extending lip 44 that is positioned at the top, open end thereof. As shown in FIG. 2, the lip 44 is rolled over about an annular or ringlike element 45 and is then sewn or adhesively secured so as to provide integral gasket means. The lip 44 rests on the upper lip 36 of the tank 24 and is held in position by a radially inward extension 46 of the inlet 26. The bottom wall of the basketlike filter media rests on a perforated support member 48 that is spaced from the bottom of the tank 24 by means of legs 50. It will be noted that the support member 48, and therefore the bottom of the filter media 40, is positioned above the outlet means 28.

The cannular support member 42 is positioned intermediate the outer surface of the filter media 40 and the inner surface of the tank 42. The cannular support member 42 rests on the perforated plate radially outward of the filter media 40 and inside the tank 24. Alternatively, indentations in the tank wall can support the lower end of the cannular member 42 or tabs can be welded to the tank wall for the same purpose. From the FIG. 3 illustration it will be seen that the cannular support member 42 provides a cushioning effect for the filter media 40 and prevents the filter media 40 from coming in contact with the inner wall of the tank 24.

Figure 4:
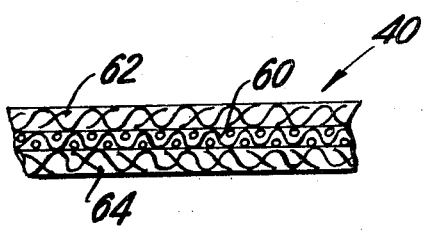
FIG. 4 is an enlarged sectional view schematically illustrating the construction of the filter media member comprising the present invention.

FIG. 4 illustrates the construction of the filter media 40. A plastic screen 60 such as dacron or polypropylene has layers 62 and 64 of nonwoven polypropylene fibers. By way of example, a suitable filter media 40 has the following characteristics:

| | |
|---|---|
| Denier of Fiber | 50% 1.5 Denier |
| Fiber Content | 100% Polypropylene |
| Weight(oz./sq.yd.) | Approx. 19 oz./sq.yd. |
| Thickness (inches) | 0.080 inches–0.100 inches |
| Porosity (% of Voids) | 66% |
| Pore size Microns | 25 μ |
| Water Permeability (Clean) (Indicated g.p.m./sq.ft. at 1.0 p.s.i.) | Approx. 37 g.p.m./sq. ft. at 1.0 p.s.i. |

Figure 5:
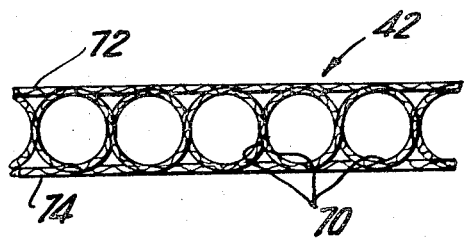
FIG. 5 is an enlarged, cross-sectional view schematically illustrating the construction of the cannular filter support member comprising the present invention.
Figure 6:
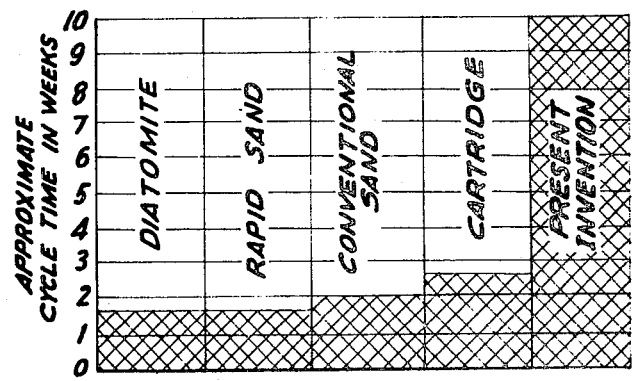
FIG. 6 is a graph comparing the filtration cycle time of the present invention with that of the four basic filtration methods.

As shown in FIG. 5, the spacer member 42 is comprised of a plurality of longitudinally extending tubular, fibrous plastic members 70 on which is woven inner and outer layers of fibrous plastic layers 72 and 74, respectively. Thus the tubes 70 are, in effect, sandwiched between the layers 72 and 74 and by virtue of the cannular construction provides a rigid and yet very porous support member for the filter media 40. It has been found that the cannular construction creates a measure of turbulence which increases the fluid flow. The filter support element 42, in its preferred form, has the following characteristics:

| | |
|---|---|
| Fiber Content (longitudinal) | Polyethylene |
| Fiber Content (latitudinal) | Polypropylene |
| Density (lbs./cu.ft.) | 3.15 lbs. cu.ft. |
| Weight (oz./sq.yd.) | 21 oz./sq.yd. |
| Thickness (inches) | 0.552 inches |

From the foregoing it is evident that a highly reliable filter means for providing "polished" water has been disclosed. It should be particularly noted that effective filtration and water clarification is achieved without the use of filter aids such as diatomite or the like. Because of the present construction, the filtering cycle is greatly lengthened. Further, because of the absence of any filtering aid, a cleaning chore that was heretofore considered very difficult and time consuming has been eliminated.

The basketlike filter media comprising the present invention is readily sewable, thus permitting the assembly of an integral gasket that is very effective. In addition the filter media, because of its nonwoven fabric type construction, is nonabrasive, shrink-resistance and easily washable. The fiber material chosen for the filter media is preferably of the type that will not support bacteriological growth.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A water-filtering unit characterized by the absence of a particulate filter medium, said filtering unit comprising the combination of:
   a. a tank having inlet and outlet means;
   b. a porous, nonself-supporting filter element in the shape of a bucket positioned within said tank to define a space between the inside wall surface of said tank and the outside wall surface of said filter element; and
   c. a cannular type porous self-supporting spacer element positioned in said space for cushioning said filter element and for preventing contact between said filter element and said tank, said spacer element comprising a plurality of circumferentially arranged, longitudinally extending fibrous tubes positioned relative to each other so as to form a cylinder and fibers bonded on the inside and outside diameters of said cylinders.

2. The filtering unit in accordance with claim 1 wherein said filter element is comprised of a mesh screen and fibers bonded on each surface of said screen.

3. The filtering unit in accordance with claim 1 wherein said filter element includes a radially extending lip integral with the open end thereof, said tank including first filter element support means proximate the upper end thereof and second spacer support means proximate the lower end thereof.

4. The filtering unit in accordance with claim 3 wherein said first support means comprises a transverse, radially extending shoulder on the inside diameter of said tank and a projection extending radially inward from the inner wall of said tank said projection being axially spaced from said shoulder to thereby releasably capture said filter element lip therebetween.

5. The filtering unit in accordance with claim 3 wherein said second support means comprises a transverse radially extending projection means integral with the inner wall surface of said tank.

6. The filtering unit in accordance with claim 1 wherein there is further included a perforated plate for supporting the bottom end of said filtering element, and means spacing said plate from the bottom of said tank, said plate being axially positioned in said tank proximate said outlet means.

7. The filtering unit in accordance with claim 1 wherein said filter element is comprised of nonwoven plastic fibers.

8. The filtering unit in accordance with claim 7 wherein said fibers are characterized by an inability to support bacteriological growth.

* * * * *